United States Patent
Do et al.

(10) Patent No.: US 8,253,901 B2
(45) Date of Patent: Aug. 28, 2012

(54) LIQUID CRYSTAL DISPLAY DEVICE HAVING BIASED ELECTRICALLY CONTROLLED BIREFRINGENCE

(75) Inventors: Hee-Wook Do, Suwon-si (KR); Seung-Hoo Yoo, Seongnam-si (KR); Hoon Kim, Ansan-si (KR); Hyun-Cheol Moon, Suwon-si (KR); Hye-Ran You, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1043 days.

(21) Appl. No.: 11/854,136

(22) Filed: Sep. 12, 2007

(65) Prior Publication Data

US 2008/0170166 A1 Jul. 17, 2008

(30) Foreign Application Priority Data

Jan. 17, 2007 (KR) .................. 10-2007-0005159

(51) Int. Cl.
*G02F 1/1337* (2006.01)
(52) U.S. Cl. ......... 349/123; 349/134; 349/132; 349/130
(58) Field of Classification Search .................. 349/123, 349/134, 132, 130
See application file for complete search history.

(56) References Cited

U.S. PATENT DOCUMENTS

| | | | | |
|---|---|---|---|---|
| 5,495,355 | A * | 2/1996 | Konuma | 349/132 |
| 6,184,854 | B1 * | 2/2001 | Hotto et al. | 345/89 |
| 6,671,017 | B2 * | 12/2003 | Lyu et al. | 349/118 |
| 6,788,374 | B2 * | 9/2004 | Ko et al. | 349/129 |
| 7,511,785 | B2 * | 3/2009 | Ito et al. | 349/117 |
| 2004/0257324 | A1 * | 12/2004 | Hsu | 345/89 |
| 2006/0072054 | A1 * | 4/2006 | Ito | 349/96 |
| 2006/0164581 | A1 * | 7/2006 | Kim et al. | 349/119 |
| 2006/0181664 | A1 * | 8/2006 | Yoo et al. | 349/141 |
| 2007/0070260 | A1 * | 3/2007 | Wang | 349/18 |
| 2007/0279541 | A1 * | 12/2007 | Mochizuki et al. | 349/36 |
| 2008/0111960 | A1 * | 5/2008 | Yoshida et al. | 349/117 |
| 2009/0046228 | A1 * | 2/2009 | Takeda et al. | 349/118 |
| 2009/0091682 | A1 * | 4/2009 | Murakami et al. | 349/61 |
| 2009/0122243 | A1 * | 5/2009 | Sugiyama et al. | 349/118 |

* cited by examiner

*Primary Examiner* — Edward Glick
*Assistant Examiner* — Sang Nguyen
(74) *Attorney, Agent, or Firm* — F. Chau & Associates, LLC.

(57) ABSTRACT

A display device includes a light supplying unit generating light and a liquid crystal panel having a liquid crystal layer including liquid crystal molecules aligned substantially parallel to the plane of a pair of substrates by anti-parallel rubbing when no voltage is applied to the panel. Bias voltage corresponding to maximum gray level of the panel is determined between threshold voltage of the liquid crystal layer and 40% of maximum voltage.

16 Claims, 6 Drawing Sheets

LIQUID CRYSTAL DISPLAY DEVICE HAVING BIASED ELECTRICALLY CONTROLLED BIREFRINGENCE

CROSS-REFERENCE TO RELATED APPLICATION

This application claims priority to Korean Patent Application No. 10-2007-0005159, filed on Jan. 17, 2007 and all the benefits accruing therefrom under 35 U.S.C. §119, and the disclosure of which is herein incorporated by reference.

BACKGROUND OF THE INVENTION

1. Technical Field

The present disclosure relates to a display device having electrically controlled birefringence.

2. Discussion of the Related Art

A liquid crystal display (LCD) device displays an image by using a liquid crystal layer. Since the LCD device may be thinner, lighter, and use a low driving voltage compare to other display devices, the LCD device has gained wide acceptance.

The LCD device includes a liquid crystal panel having color filters to display color and a light supplying unit having a light source such as a cold cathode florescent lamp (CCFL) and a light emitting diode (LED) to provide light to the liquid crystal panel.

Due to the characteristic of the liquid crystal layer, image quality of the LCD device can deteriorate when users watch the panel from an upper side or a tower side of the liquid crystal panel. In other words, gray inversion can occur. Various methods have been developed to reduce the gray inversion in oblique view. One of them is a multi domain method such as an in plane switching (IPS) mode or a patterned vertical alignment (PVA) mode. However, the IPS mode or the PVA mode requires an additional process and a structure for domain dividing. Another approach is an electrically controlled birefringence (ECB) mode with wide viewing films. While ECB mode may perform wide viewing angle easily when wide viewing films are applied, gray inversion in high gray levels can be more severe when viewed from an upper direction, and can be more yellowish from a side view direction.

SUMMARY OF THE INVENTION

A display device with ECB mode according to an exemplary embodiment of the present invention includes a pair of substrates electrodes formed on each one side of the substrates, alignment layers formed on the electrodes and facing each other by a space and a liquid crystal layer including liquid crystal molecules filled in the space between the alignment layers. At least part of the liquid crystal molecules are aligned substantially parallel to a plane of the substrates by anti-parallel rubbing when no voltage is applied to the electrodes and aligned to tilt to the plane of the substrates when biased voltage is applied to the electrodes. The biased voltage is selected between threshold voltage of the liquid crystal layer and maximum voltage of the liquid crystal layer, and which is corresponding to maximum gray. A pair of polarizers are disposed on the outer surface of the substrates and the transmission axes of the polarizers and longer axes of the liquid crystal molecules is formed an angle about 45 degree.

A display device with ECB mode according to an exemplary embodiment of the present invention includes a light supplying unit generating light and a liquid crystal panel. The liquid crystal panel is disposed on the light supplying unit and includes a pair of substrates, electrodes formed on each side of the substrates, alignment layers formed on the electrodes and facing each other by a space and a liquid crystal layer including liquid crystal molecules filled in the space between the alignment layers. At least part of the liquid crystal molecules are aligned substantially parallel to a plane of the substrates by anti-parallel rubbing when no voltage is applied to the electrodes. Bias voltage which is corresponding to maximum gray level is higher than threshold voltage of the liquid crystal layer and lowers than 40% of maximum voltage which is corresponding to minimum gray level. Sum of retardation value of the liquid crystal layer and retardation value of the wide viewing films may be in arrange of from about 220 nm to about 330 nm. When the maximum voltage is applied, the liquid crystal panel has minimum light transparent. Furthermore, the liquid crystal molecules located in the middle of the liquid crystal layer is more tilted to the plane of the pair of substrates than the liquid crystal molecules located in the edge of the liquid crystal layer is. The maximum gray level and minimum gray level are determined depending on the amount of light which transmits the liquid crystal panel from the light supplying unit.

BRIEF DESCRIPTION OF THE DRAWINGS

Exemplary embodiments of the present invention can be understood in more detail from the following descriptions taken in conjunction with the accompanying drawings, in which.

DESCRIPTION OF EXEMPLARY EMBODIMENTS

Exemplary embodiments of the present invention are described more fully hereinafter with reference to the accompanying drawings, in which exemplary embodiments of the invention are shown. This invention may, however, be embodied in many different forms and should not be construed as limited to the embodiments set forth herein.

A display device in accordance with an exemplary embodiment of the present invention includes a light supplying unit, a liquid crystal panel and a driving circuit.

Since the liquid crystal panel is not a self-emissive device, a light source needs to be supplied to illuminate light through the liquid crystal panel to display an image. The light supplying unit includes a light source and a light guiding element including a light enhancing element such as a prism film and/or a diffuser film. The liquid crystal panel includes a pair of polarizers, a pair of substrates facing each other, electrodes formed on the substrates and liquid crystal molecules filled in between the pair of substrates. The substrates include a liquid crystal alignment layer. The liquid crystal molecules are aligned along the rubbing direction through a rubbing process. An anti-parallel rubbing direction of the liquid crystal alignment layer of upper substrate and lower substrate may be applied. However, a middle of the liquid crystal molecules filled in the space is aligned by a material characteristic or an electric field when voltage is applied to the electrodes. In conventional ECB mode, liquid crystal molecules are aligned substantially parallel to the plane of the substrates by rubbing direction when voltage corresponding to maximum gray level in normally white mode is applied.

According to an exemplary embodiment of the present invention, a biased ECB mode is applied. In a biased ECB mode, the middle of liquid crystal molecules is tilted to the plane of the substrates when the voltage corresponding to maximum gray level is applied to the electrodes in normally white mode. In an embodiment, in a normally white mode, gray level is divided into sixty four (64) levels. Maximum gray level is sixty fourth (64th) gray (white state) and minimum gray level is first (1st) gray level (dark state). Minimum gray level is displayed when the maximum voltage corresponding to dark state is applied and maximum gray level is displayed when the minimum voltage corresponding to the white state is applied. In the biased ECB mode, the difference between the sum of retardation value of the front view and the sum of retardation value of the upper view is much smaller than that of conventional ECB mode. The smaller the difference is, the less the difference in color and brightness of the image is. A display device having ECB according to an exemplary embodiment of the present invention includes a pair of substrates, electrodes formed on each side of the substrates, alignment layers formed on the electrodes, and a liquid crystal layer including liquid crystal molecules filled in a space between the alignment layers. At least part of the liquid crystal molecules are aligned substantially parallel to the plane of the substrates by anti-parallel rubbing when no voltage is applied to the electrodes, and aligned to tilt to the plane of the substrates when biased voltage between threshold voltage of the liquid crystal layer and maximum voltage of the liquid crystal layer is applied. The maximum voltage may correspond to maximum gray applied to the electrodes.

Figure 1:
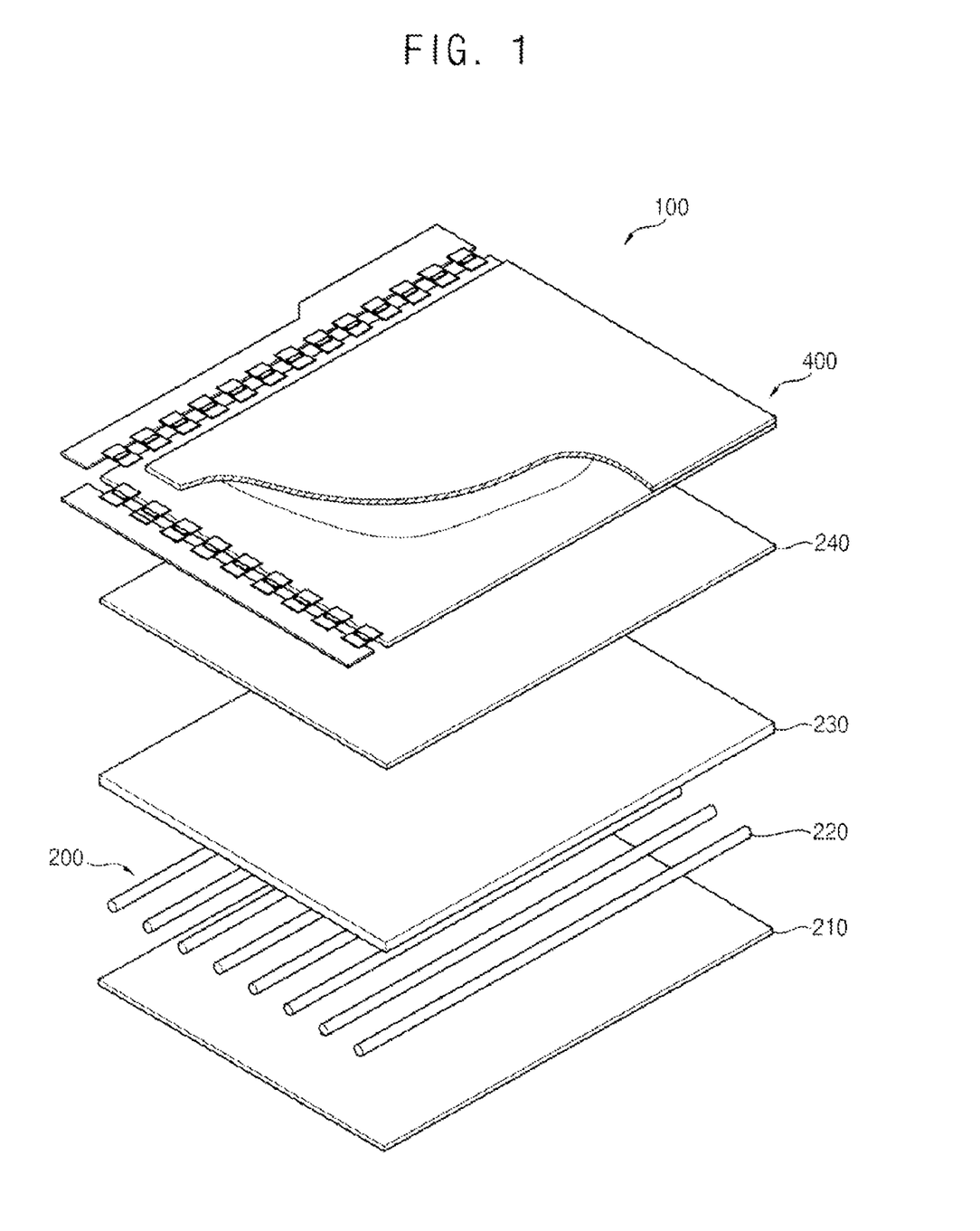
FIG. 1 is an exploded perspective view showing a display device according to an exemplary embodiment of the present invention.

A display device with ECB mode according to an exemplary embodiment of the present invention includes a light supplying unit generating light and a liquid crystal panel. The liquid crystal panel is disposed on the light supplying unit and includes a pair of substrates, electrodes formed on each of the substrates, alignment layers formed on the electrodes and a liquid crystal layer including liquid crystal molecules filled in a space between the alignment layers. At least part of the liquid crystal molecules are aligned substantially parallel to the plane of the substrates by anti-parallel rubbing when no voltage is applied to the electrodes. Bias voltage corresponding to maximum gray level is over than threshold voltage of the liquid crystal layer and corresponding to minimum gray level is lower than about 40% of maximum voltage, FIG. 1 is an exploded perspective view showing a display device according to an exemplary embodiment of the present invention.

Figure 4:
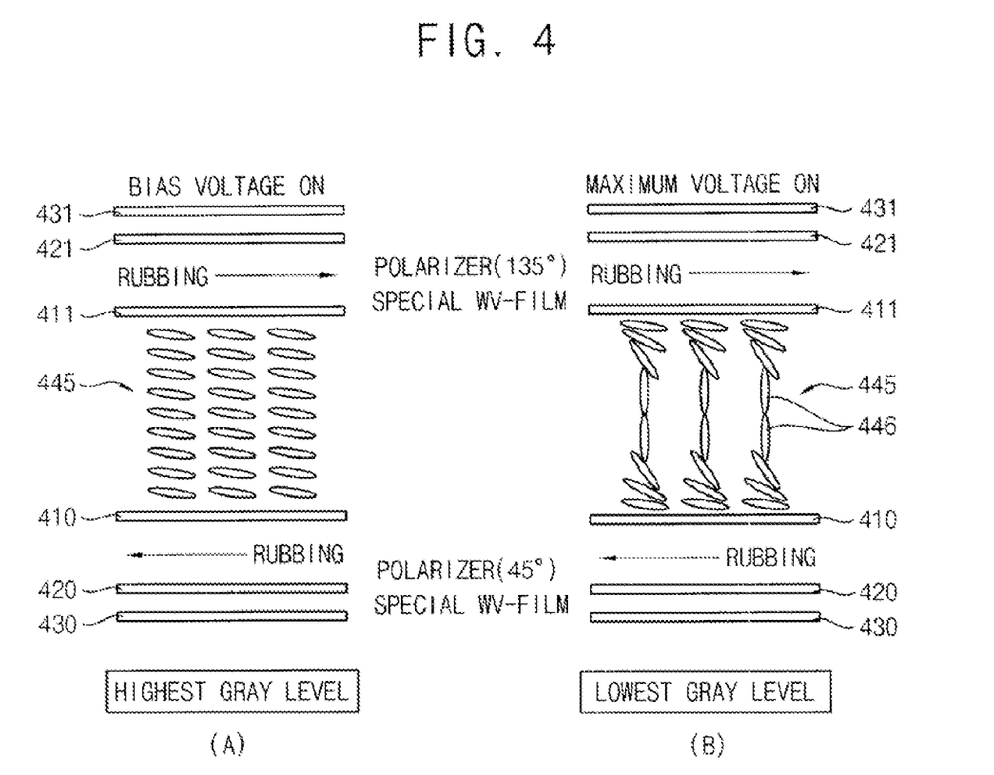
FIG. 4 is a plan view showing the movement of liquid crystal molecules when bias voltage is applied and maximum voltage is applied according to an exemplary embodiment of the present invention.

FIG. 4 is a plan view showing a motion of liquid crystal molecules when bias voltage is applied and maximum voltage is applied according to an exemplary embodiment of the present invention.

Referring to FIG. 4, a display device 100 includes a light supplying unit 200 and a liquid crystal panel 400. The light supplying unit 200 includes a light source 220, a reflector 210, a light guiding element 230 and a light enhancing element 240. The light generated by a light source 220 is guided by the light guiding element 230 and the reflector 210 to the liquid crystal panel 400. The light enhancing element 240 includes a prism and/or a diffuser. The amount of incident light from the light supplying unit 200 through the liquid crystal panel 400 is controlled by the liquid crystal panel 400. The liquid crystal panel 400 includes a pair of polarizers 430 and 431, a pair of substrates 410 and 411 and the liquid crystal layer 445. Electrodes (not shown in FIG. 1) are formed on each side of the substrates 410 and 411 and facing each other. A liquid crystal alignment layer is formed on each of the electrodes. The liquid crystal molecules are filled in the space between the substrates 410 and 411.

Liquid crystal alignment layers are rubbed in an anti-parallel direction. When no voltage is applied to the electrodes, liquid crystal molecules are aligned along the rubbing direction of liquid crystal alignment layers formed on an upper substrate 411 and a lower substrate 410. A wide viewing film 420 and 421 may be disposed on one or both of the substrates 410 and 411. When normally white mode is used, and no voltage is applied to the electrodes, the display device 100 becomes a white state and the liquid crystal molecules are aligned substantially parallel to the plane of substrates 410 and 411 in conventional ECB mode. When maximum voltage is applied, the display device 100 becomes a black state. It is required to divide gray levels from first (1st) gray to sixty-fourth (64th) gray to display images. First (1st) gray means that maximum voltage is applied and black state is displayed. Sixty fourth (64th) gray means that biased voltage is applied and white state is applied. In Biased ECB mode, the liquid crystal molecules 446 located in the middle of the liquid crystal layer 445 are tilted to the plane of the substrates 410 and 411 when biased voltage is applied. Biased voltage is determined between threshold voltages of the liquid crystal layer 445 and maximum voltage. However, to form 64 gray levels, biased voltage is determined between threshold voltages of the liquid crystal layer 445 and about 40% of the maximum voltage. When biased voltage is determined over about 40% of the maximum voltage, the amount of penetrating light of the liquid crystal panel 400 is very low and the brightness is decreased. When biased voltage is determined less than threshold voltage liquid crystal molecules 446 located in the middle of liquid crystal layer 445 can not be tilted to the plane of the substrates 410 and 411.

FIG. 4(A) shows that when biased voltage is applied, liquid crystal molecules 446 in the middle of liquid crystal layer 445 are tilted to the plane of the substrates 410 and 411. This status corresponds to the highest gray level white state, sixty fourth (64th) gray).

FIG. 4(B) illustrates that when maximum voltage is applied, liquid crystal molecules 446 in the middle of liquid crystal layer 445 are almost orthogonal to the plane of the substrates 410 and 411. This status corresponds to the lowest gray level (black state, first (1st) gray).

Figure 2:
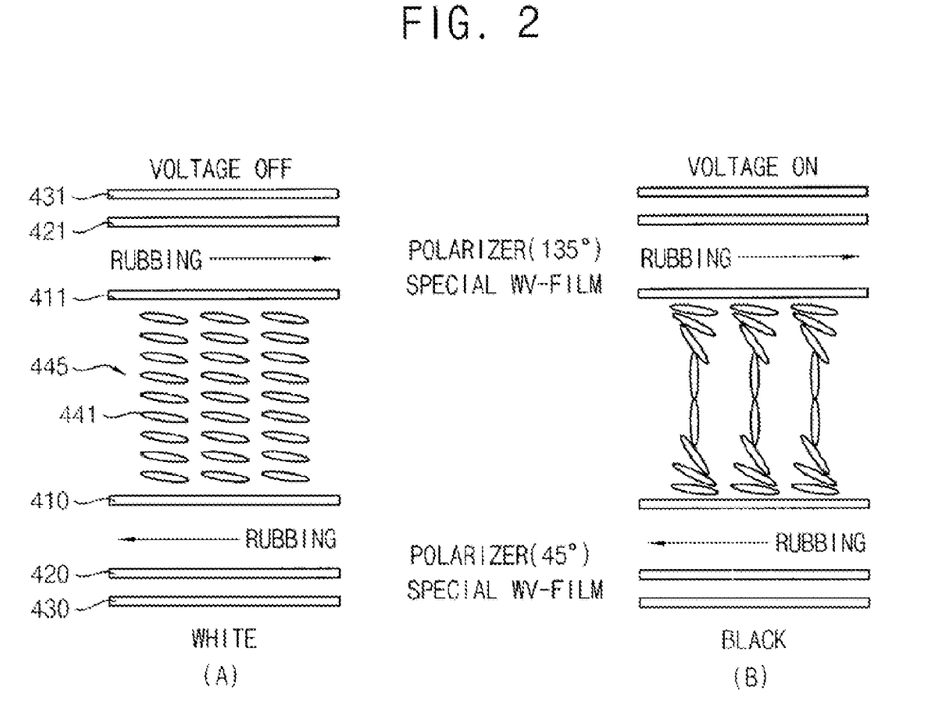
FIG. 2 is a conventional ECB mode showing the movement of liquid crystal molecules when a voltage is applied.

FIG. 2 is a conventional ECB mode showing the movement of liquid crystal molecules 441 when a voltage is applied. To display the highest gray level (white status, sixty fourth (64th) gray), liquid crystal molecules 441 located in the middle of liquid crystal layer 445 are not tilted to the plane of the substrates 410 and 411, but aligned substantially parallel to the plane of the substrates 410 and 411.

Figure 3:
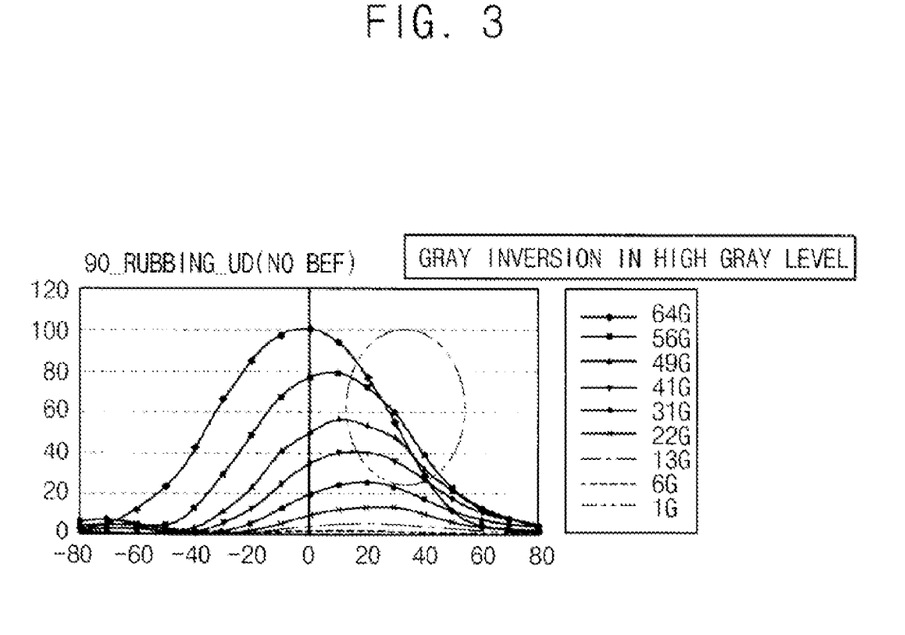
FIG. 3 is a diagram showing gray inversion of higher gray level in view of side direction when the conventional ECB mode illustrated in FIG. 2 displays an image.
Figure 5:
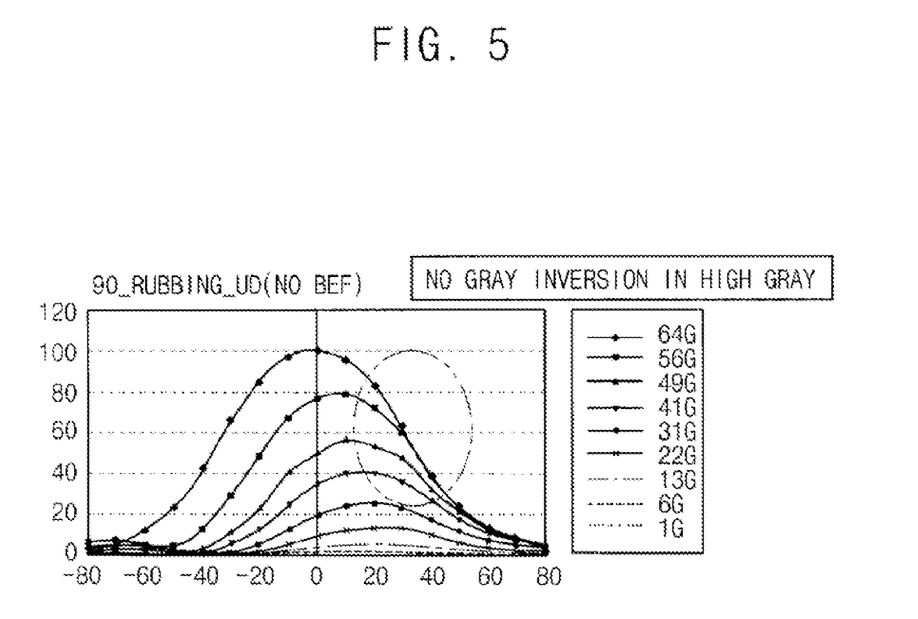
FIG. 5 is a diagram showing relative value of the amount of transparent light of each gray level depending on the angle of side view (−80 degree to +80 degree) when the biased ECB mode illustrated in FIG. 4 displays an image.

FIG. 3 is a diagram showing gray inversion of higher gray level in view of side direction when the conventional ECB mode illustrated in FIG. 2 displays an image. It is shown that gray inversion between sixty fourth (64th) gray and fifty sixth (56th) gray occurs at about 30 degrees oblique direction. However, FIG. 5 is showing no gray inversion among high gray levels when Biased ECB mode illustrated in FIG. 4 displays an image.

Figure 6:
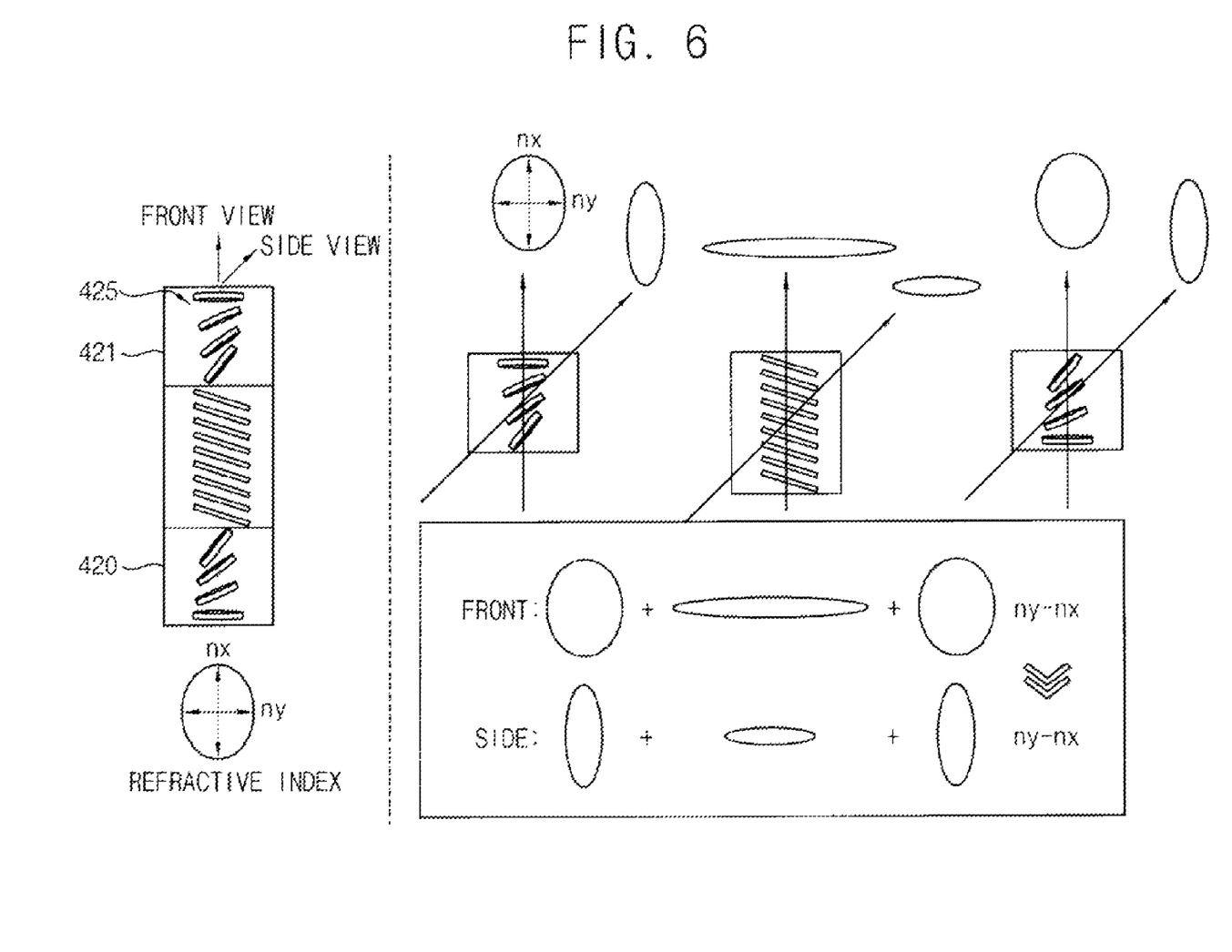
FIG. 6 is a diagram showing the summing of retardation values of the conventional ECB mode.
Figure 7:
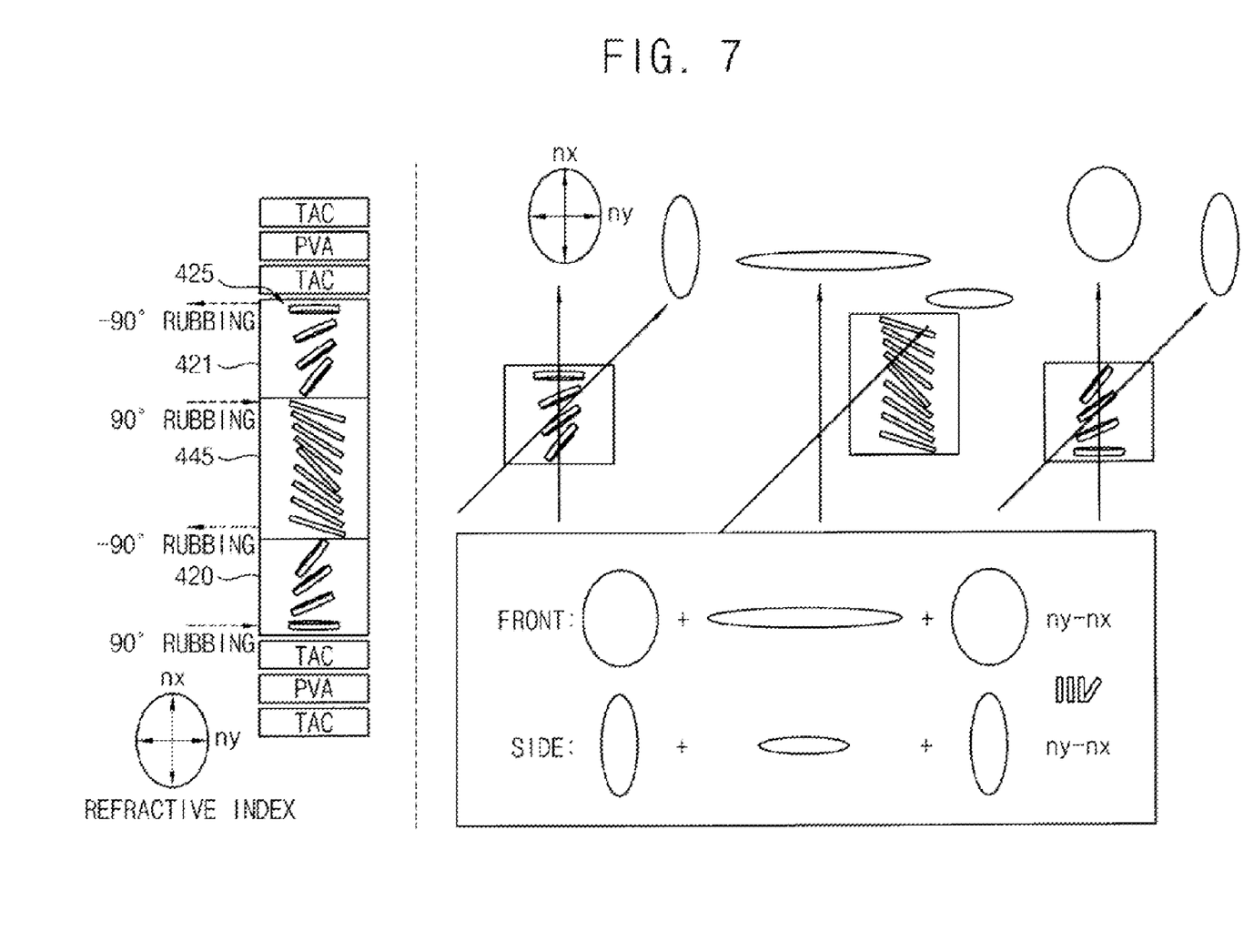
FIG. 7 is a diagram showing the summing of retardation values of the biased ECB mode.

FIG. 6 is a diagram showing the summing of retardation value of the conventional ECB mode, and FIG. 7 is a diagram showing the summing of retardation value of Biased ECB mode. The liquid crystal material used in ECB mode and a discotic liquid crystal material 425 used in wide viewing film are optically anisotropic. This means that retardation value can be varied depending on user's viewing direction. Retardation value corresponds to the difference between refractive index of x-axis and refractive index of y-axis. When a user watches a display panel 100, the user sees an image mainly controlled by a pair of wide viewing films 420 and 421 and liquid crystal molecules. Wide viewing films 420 and 421 used in ECB mode may include disk shaped uniaxial material, so called discotic liquid crystal material 425 which is aligned in hybrid type as shown in FIGS. 6 and 7. From the front view, light penetrating a pair of wide viewing films passes through the normal direction of the disk shape of the discotic liquid crystal material 425. In this case, the retardation value is very small. From the side view, light penetrating a pair of wide viewing films 420 and 421 passes through in an oblique direction of disk shape of the discotic liquid crystal material 425. The retardation value of a pair of wide viewing films 420 and 421 from the front view is larger than the retardation value of a pair of wide viewing films 420 and 421 from the side view. When light passes through the liquid crystal layer 440 of the conventional ECB mode shown in FIG. 6, the retardation value of liquid crystal layer 440 from the front view is much larger than the retardation value of liquid crystal layer 440 from the side view.

Since the liquid crystal molecules 441 used in the conventional ECB are aligned substantially to the plane of substrates 410 and 411 in high gray levels (normally white mode), the difference between the retardation value of liquid crystal layer 440 from the front view and the retardation value of the liquid crystal layer 440 from the side view is much larger. However, when light passes through the liquid crystal layer 445 of biased ECB mode shown in FIG. 7, the retardation value of the liquid crystal layer 445 from the front view is not much larger than the retardation value of the liquid crystal layer 445 from the side view. Since the liquid crystal molecules 446 used in biased ECB are tilted to the plane of substrates 410 and 411 in high gray levels (normally white mode), the difference between the retardation value of the liquid crystal layer 445 from the front view and the retardation value of the liquid crystal layer 445 from the side view is decreased when it is compared to the difference of conventional ECB. Consequently, in the conventional ECB mode, the sum of the retardation value of the liquid crystal layer 440 and a pair of wide viewing films 420 and 421 from the front view is much larger than that from the side view. In an embodiment, the sum of retardation value of the liquid crystal layer and retardation value of the wide viewing film may be in a range of from about 220 nm to about 330 nm.

This big difference in the retardation value depending on viewing direction makes gray inversion in high gray levels. However, in biased ECB mode, the sum of the retardation value of liquid crystal layer 445 and a pair of wide viewing films 420 and 421 from the front view is larger than that from the side view but, the difference is decreased. Therefore, gray inversion is decreased in the biased ECB mode.

Figure 8:
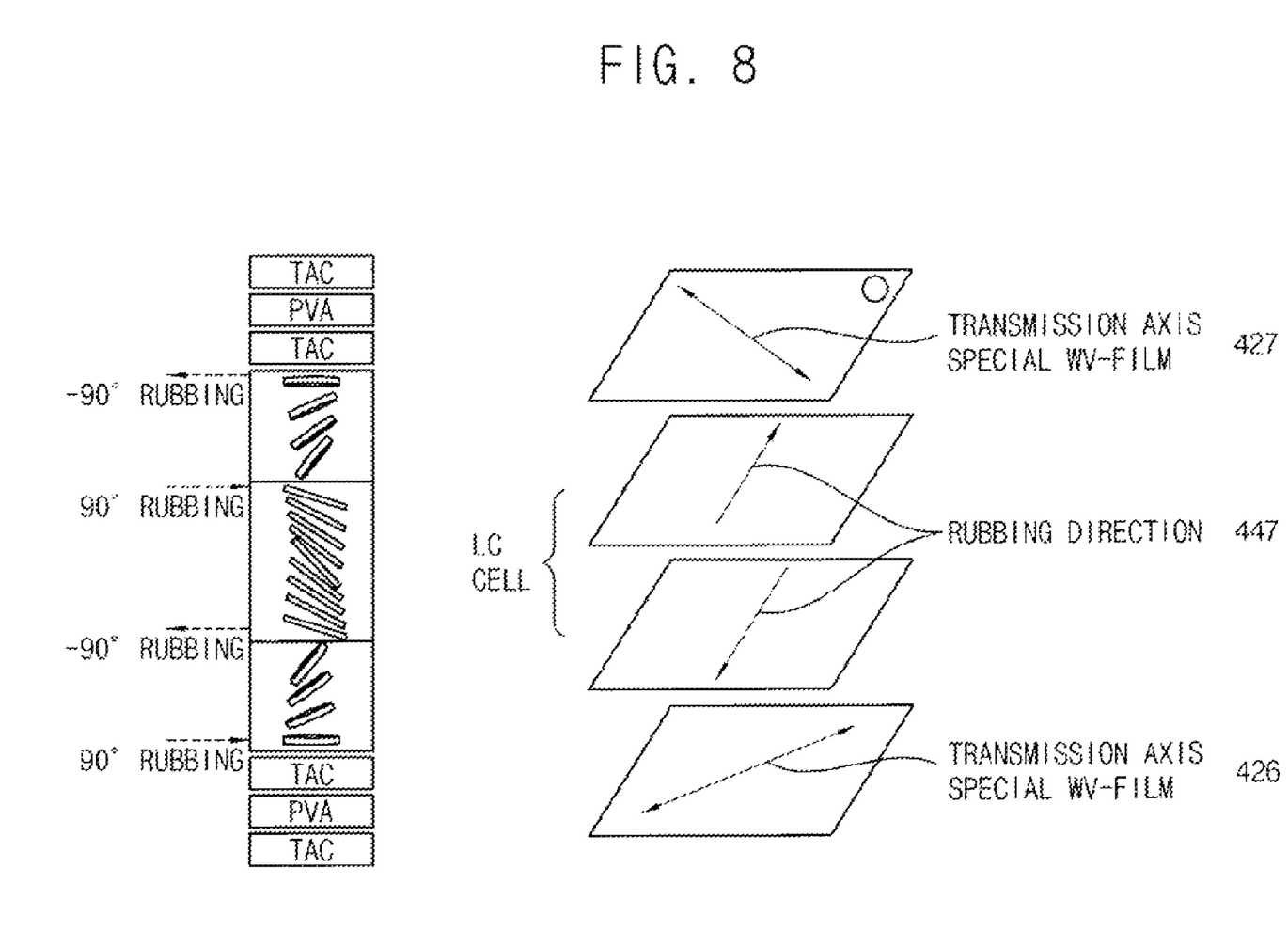
FIG. 8 is a diagram showing a relationship between a transmission of wide viewing films and rubbing directions of a liquid crystal panel.

FIG. 8 is a diagram showing a relationship between the transmission axes 426 and 427 of wide viewing films 420 and 421 and the rubbing directions 447 of the liquid crystal panel 400. The transmission axes 426 and 427 of a pair of wide viewing films 420 and 421 cross each other at about 90 degrees. The angle between the transmission axis of wide viewing film and rubbing direction of alignment layer disposed adjacent to the wide viewing film is about 45 degree.

Although the illustrative embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A display device comprising:
   a pair of substrates;
   electrodes formed on each side of the substrates;
   alignment layers formed on the electrodes and facing each other;
   a liquid crystal layer including liquid crystal molecules filled in between the alignment layers, wherein rubbing directions of the alignment layers formed on the electrodes of respective substrates are anti-parallel to each other; and
   wide viewing films respectively disposed on the substrates, wherein transmission axes of the wide viewing films cross each other at about 90 degrees and an angle between the transmission axis of a wide viewing film and a rubbing direction of an alignment layer disposed adjacent to the wide viewing film is about 45 degrees, and
   wherein at least part of the liquid crystal molecules are aligned substantially parallel to the plane of the substrates by anti-parallel rubbing when no voltage is applied to the electrodes, and the liquid crystal molecules positioned at a middle portion of the liquid crystal layer between the alignment layers are aligned to tilt to the plane of the substrates at substantially the same angle as the liquid crystal molecules positioned adjacent the substrates when biased voltage is applied to the electrodes, the biased voltage is applied at a level between a threshold voltage of the liquid crystal layer, and a maximum voltage of the liquid crystal layer, the maximum voltage corresponds to maximum gray level
   wherein an entirety of the liquid crystal molecules is aligned in substantially the same direction when the bias voltage is applied to the electrodes.

2. The display device of claim 1, further comprising a polarizer disposed on each side of the substrates, wherein transmission axes of the polarizers cross each other.

3. The display device of claim 2, wherein an angle between the transmission axes of the polarizers and longer axes of the liquid crystal molecules is about 45 degrees.

4. The display device of claim 1, wherein the wide viewing films comprise a discotic liquid crystal material stacked in hybrid.

5. The display device of claim 1, wherein sum of retardation value of the liquid crystal layer and retardation value of the wide viewing film is in a range of from about 220 nm to about 330 nm.

6. The display device of claim 2 further comprising a light supplying unit having a light source disposed behind the pair of substrates.

7. The optical sheet of claim 6, wherein incident light generated from the light supplying unit and penetrated to the pair of substrates is blocked with the polarizers when maximum voltage is applied to the liquid crystal layer.

8. A display device comprising:
a light source to generate light;
a liquid crystal panel disposed in the path of the light source, the liquid crystal panel including a pair of substrates, electrodes formed on each side of the substrates, alignment layers formed on the electrodes and facing each other and a liquid crystal layer including liquid crystal molecules filled in a space between the alignment layers, wherein rubbing directions of the alignment layers formed on the electrodes of respective substrates are anti-parallel to each other, and wherein at least part of the liquid crystal molecules are aligned substantially parallel to the plane of the substrates by anti-parallel rubbing when no voltage is applied to the electrodes;
a polarizer disposed on each of opposite sides of the liquid crystal panel, wherein transmission axes of the polarizers are crossed at 90 degree; and
wide viewing films respectively disposed on the substrates,
wherein transmission axes of the wide viewing films cross each other at about 90 degrees and an angle between the transmission axis of a wide viewing film and a rubbing direction of an alignment layer disposed adjacent to the wide viewing film is about 45 degrees,
wherein bias voltage corresponding to maximum gray level is higher than threshold voltage of the liquid crystal layer, and lower than 40% of maximum voltage corresponding to minimum gray level, and
wherein, when the bias voltage is applied to the electrodes, the liquid crystal molecules located in the middle of the liquid crystal layer between the alignment layers are tilted to the plane of the pair of substrates at substantially the same angle as the liquid crystal molecules positioned adjacent the substrates, wherein an entirety of the liquid crystal molecules is aligned in substantially the same direction when the bias voltage is applied to the electrodes.

9. The display device of claim 8, wherein the wide viewing films comprise discotic liquid crystal material stacked in hybrid.

10. The display device of claim 8, wherein sum of retardation value of the liquid crystal layer and retardation value of the wide viewing film is in a range of from about 220 nm to about 330 nm.

11. The display device of claim 8, wherein the maximum voltage corresponding to minimum gray level is in a range of from about 10 volts to about 12 volts.

12. The display device of claim 8, wherein the liquid crystal panel has minimum light transparent when the maximum voltage is applied.

13. The display device of claim 8, wherein the liquid crystal molecules located in the middle of the liquid crystal layer are more tilted to the plane of the pair of substrates than are the liquid crystal molecules positioned adjacent the substrates when the maximum voltage is applied to the electrodes.

14. The display device of claim 8, wherein the maximum gray level and minimum gray level are determined depending on the amount of light which transmits to the liquid crystal panel from the light supplying unit.

15. The display device of claim 8, wherein the liquid crystal molecules comprise a positive dielectric material.

16. The display device of claim 8, wherein the liquid crystal layer comprises nematic liquid crystal.

* * * * *